United States Patent
Valente et al.

(10) Patent No.: US 12,166,236 B2
(45) Date of Patent: Dec. 10, 2024

(54) UNIFORMLY DISPERSING PRECIPITATED SILICA, PROCESS FOR PREPARING THE SAME, BATTERY SEPARATOR INCLUDING THE SAME, AND LEAD-ACID BATTERY INCLUDING THE SAME

(71) Applicant: RHODIA OPERATIONS, Aubervilliers (FR)

(72) Inventors: Jules Valente, Paris (FR); Brice Schlegel, Princeton, NJ (US); Lionel Barriquand, Vaux-en-Beaujolais (FR)

(73) Assignee: RHODIA OPERATIONS, Lyons (FR)

( * ) Notice: Subject to any disclaimer, the term of this patent is extended or adjusted under 35 U.S.C. 154(b) by 138 days.

(21) Appl. No.: 17/299,357

(22) PCT Filed: Dec. 9, 2019

(86) PCT No.: PCT/EP2019/084215
§ 371 (c)(1),
(2) Date: Jun. 3, 2021

(87) PCT Pub. No.: WO2020/120393
PCT Pub. Date: Jun. 18, 2020

(65) Prior Publication Data
US 2022/0021077 A1 Jan. 20, 2022

(30) Foreign Application Priority Data

Dec. 11, 2018 (EP) ..................... 18306665

(51) Int. Cl.
| | |
|---|---|
| *H01M 50/446* | (2021.01) |
| *C01B 33/193* | (2006.01) |
| *H01M 50/403* | (2021.01) |
| *H01M 50/417* | (2021.01) |

(52) U.S. Cl.
CPC ......... *H01M 50/446* (2021.01); *C01B 33/193* (2013.01); *H01M 50/403* (2021.01); *H01M 50/417* (2021.01)

(58) Field of Classification Search
CPC ............. H01M 50/446; H01M 50/403; H01M 50/417; C01B 22/193
USPC .................. 429/129, 251, 254; 423/335, 339
See application file for complete search history.

(56) References Cited

U.S. PATENT DOCUMENTS

| | | |
|---|---|---|
| 6,191,205 B1 | 2/2001 | Micouin et al. |
| 6,468,493 B1 * | 10/2002 | Chevallier ............... C08K 3/36 |
| | | 423/339 |
| 2003/0022068 A1 * | 1/2003 | Pekala ................. H01M 50/494 |
| | | 429/248 |
| 2005/0032965 A1 * | 2/2005 | Valero ...................... C08K 3/36 |
| | | 524/493 |
| 2008/0019898 A1 * | 1/2008 | Dromard .............. H01M 50/443 |
| | | 423/339 |
| 2009/0010832 A1 | 1/2009 | Jasra et al. |
| 2009/0214449 A1 * | 8/2009 | Valero ................... C01B 33/193 |
| | | 106/491 |
| 2010/0083876 A1 * | 4/2010 | Lahary ................. C01B 33/187 |
| | | 423/339 |
| 2013/0156674 A1 * | 6/2013 | Guy ...................... C01B 33/193 |
| | | 423/327.1 |
| 2013/0171051 A1 | 7/2013 | Clouin et al. |
| 2015/0030518 A1 | 1/2015 | Allain et al. |
| 2015/0207121 A1 | 7/2015 | Frenzel et al. |
| 2015/0210555 A1 | 7/2015 | Clouin et al. |

FOREIGN PATENT DOCUMENTS

| | | | |
|---|---|---|---|
| CN | 1418811 A * | 5/2003 | |
| WO | WO-02051749 A1 * | 7/2002 | ............. B82Y 30/00 |
| WO | 2008136019 A2 | 11/2008 | |

OTHER PUBLICATIONS

Standard NF ISO 5794-1, Appendix G (Mar. 2010). Rubber compounding ingredients—Silica, precipitated, hydrated—Part 1: Non-rubber tests (36 pg.).
Standard NF ISO 5794-1, Appendix E (Mar. 2010). Rubber compounding ingredients—Silica, precipitated, hydrated—Part 1: Non-rubber tests (8 pg.).
ISO standard 1628-3—Third Edition, May 2010. Plastics—Determination of the viscosity of polymers in dilute solution using capillary viscometers—Part 3: Polyethylenes and polypropylenes (12 pg.).

* cited by examiner

*Primary Examiner* — Sean P Cullen

(74) *Attorney, Agent, or Firm* — Osha Bergman Watanabe & Burton LLP

(57) ABSTRACT

A precipitated silica suitable for use in lead-acid battery separators having a good balance between mechanical properties and electrical resistivity. In particular, a precipitated silica characterised by a DOA oil absorption equal to or greater than 200 mL/100 g; a median aggregate size $D50_M$ equal to or lower than 8.7 μm and equal to or greater than a parameter A whose value, expressed in microns, is calculated from equation (1): $A=23.3-0.076 \times |DOA|$, wherein $|DOA|$ represents the numerical value of the DOA oil absorption expressed in mL/100 g.

14 Claims, No Drawings

UNIFORMLY DISPERSING PRECIPITATED SILICA, PROCESS FOR PREPARING THE SAME, BATTERY SEPARATOR INCLUDING THE SAME, AND LEAD-ACID BATTERY INCLUDING THE SAME

CROSS-REFERENCE TO RELATED APPLICATIONS

This application is a U.S. national stage entry under 35 U.S.C. § 371 of International Application No. PCT/EP2019/084215 filed Dec. 9, 2019, which claims priority to European patent application No. 18306665.3, filed on Dec. 11, 2018, the whole content of this application being incorporated herein by reference for all purposes.

TECHNICAL FIELD

The present invention relates to precipitated silica for use in the preparation of battery separators.

BACKGROUND ART

The use of precipitated silica as a component of microporous battery separators is known.

In the manufacture of a typical microporous battery separator precipitated silica is combined with a polyolefin, generally high molecular weight polyethylene, a process oil, and other ingredients to form a separator mixture that is extruded through a slot die to form an oil-filled sheet. The oil-filled sheet is calendered to its desired thickness and profile, and the majority of the process oil is extracted. The sheet is dried to form a microporous polyolefin separator, hereinafter referred to as "separator", and it is slit into an appropriate width for a specific battery design.

During battery manufacture, the separator is fed to a machine that forms "envelopes" by cutting the separator material and sealing its edges such that an electrode can be inserted to form an electrode package. The electrode packages are stacked such that the separator acts as a physical spacer and an electronic insulator between positive and negative electrodes. An electrolyte is then introduced into the assembled battery to facilitate ionic conduction within the battery.

The primary purpose of the polyolefin contained in the separator is to provide mechanical integrity to the separator during the battery manufacturing process as well as during its operation. Thus, the polyolefin preferably has a molecular weight that provides sufficient molecular chain entanglement to form a microporous web with high puncture resistance. Ultra-high molecular weight polyethylene is the material of choice.

The primary purpose of the silica is to increase the acid wettability of the separator web, thereby lowering the electrical resistivity of the separator. In the absence of silica, the sulfuric acid would not wet the hydrophobic polyolefin material and ion transport would not occur, resulting in an inoperative battery.

Typically, a polyethylene-based separator has a silica-to-polyethylene weight ratio of between 1.5:1 and 3.5:1. One reason a large amount of silica is required is that the silica particles are not completely broken down into their individual aggregates during the extrusion process, thereby providing insufficient silica dispersion throughout the separator web. Increasing the amount of silica in the web relative to the amount of polyolefin results in low electrical resistance at the expense of puncture resistance.

On the other hand decreasing the concentration of silica in the polyethylene separator would undesirably increase the electrical resistivity and/or reduce the acid wettability.

It is therefore desirable to produce a microporous polyolefin separator, preferably a microporous polyethylene separator, having a material composition that provides good balance among mechanical resistance, dispersion of the precipitated silica in the polyolefin matrix and low electrical resistivity.

A dispersible precipitated silica has now been found which may be used to form battery separators of low specific resistance and good mechanical properties.

DESCRIPTION OF INVENTION

Object of the invention is a precipitated silica characterised by:
- a DOA oil absorption equal to or greater than 200 mL/100 g;
- a median agglomerate size $D50_M$ equal to or below 8.7 μm and equal to or greater than the value, expressed in microns, of parameter A calculated from equation (1):

$$A = 23.3 - 0.076 \times |DOA| \quad (I)$$

wherein |DOA| represents the numerical value of the DOA oil absorption expressed in mL/100 g.

For the avoidance of doubts, the symbol "×" in equation (I) represents the multiplication sign, such that the expression "a×b" means a multiplied by b.

In the present specification numerical ranges defined by the expression "from a to b" indicate a numerical range which includes end values a and b.

In the present specification, the terms "silica" and "precipitated silica" and "$SiO_2$" are used as synonyms.

The precipitated silica of the invention is characterised by a DOA oil absorption equal to or greater than 200 mL/100 g. The expression "DOA oil absorption" refers to the oil absorption capacity of the precipitated silica measured by using di-(2-ethylhexyl) adipate (DOA) and expressed as mL of oil per 100 g of $SiO_2$.

The DOA oil absorption is typically equal to or greater than 205 mL/100 g, preferably equal to or greater than 210 mL/100 g. The DOA oil absorption may even be equal to or greater than 215 mL/100 g, still equal to or greater than 230 mL/100 g. The DOA oil absorption generally does not exceed 380 mL/100 g, even 350 mL/100 g, still 310 mL/100 g.

In an advantageous embodiment the DOA oil absorption is from 205 to 380 mL/100 g, preferably from 210 to 350 mL/100 g.

The oil absorption capacity of the inventive silica, as measured by means of the DOA oil absorption, correlates with the ability of the silica to incorporate large amounts of the process oil during the separator sheet extrusion process.

The ability of the precipitated silica to uniformly disperse in the polymeric matrix is an important factor for obtaining separators having a good balance between low electrical resistivity and mechanical properties.

It has been found that a good indication of the ability of the precipitated silica to disperse in the polymeric matrix is provided by the size of the silica agglomerates as determined by means of laser diffraction performed on a suspension of silica after treatment with ultrasonic waves. The median agglomerate size $D50_M$ is taken as a measure of the silica dispersibility level.

It has been found that battery separators having a good balance between electrical resistivity and mechanical properties can be obtained when the precipitated silica has a median agglomerate size $D50_M$, as determined by laser diffraction as detailed hereafter, equal to or lower than 8.7 m and equal to or higher than the value, expressed in microns, of parameter A as determined by equation (1):

$$A=23.3-0.076\times|DOA| \quad (I).$$

In equation (I), |DOA| represents the numerical value of the DOA oil absorption expressed in mL/100 g. |DOA| is an adimensional number. As an example if the measured value of DOA is 200 mL/100 g, |DOA| is 200.

The median agglomerate size $D50_M$ may conveniently be equal to or less than 8.6 µm, even equal to or less than 8.5 µm. Generally the median agglomerate size $D50_M$ is not less than 3.0 µm.

In general, the lower the value of the median agglomerate size $D50_M$ the higher the ability of precipitated silica to disperse. However it has been found that if $D50_M$ is lower than the value of A mechanical properties of the separator are dramatically decreased because of polymer degradation. If $D50_M$ is greater than 8.7 m mechanical properties of the separator are also reduced because of defects in the separator due to poor silica dispersion.

Depending on the source of the starting material used for the preparation of the precipitated silica, traces of metals may be present in the silica. The amount of said metals should be as low as possible as they can cause undesired side reactions during the operation of the battery and thus have a negative impact on the lifetime of the battery. Among said metals mention may be made of aluminium, an element which is generally found in the alkali metal silicates commonly used as the starting material for the preparation of precipitated silica.

The precipitated silica of the invention preferably contains less than 1500 ppm of aluminium, typically less than 1000 ppm. The amount of aluminium is defined as the amount by weight of aluminium metal with respect to the weight of silica. The content of aluminium may be as low as 100 ppm. The inventive silica also contains low amounts of other metals, in particular alkali metals.

The inventive silica is generally characterised by a CTAB surface area $S_{CTAB}$ of at least 90 m²/g, typically at least 100 m²/g.

The CTAB surface area does not exceed 250 m²/g, typically it does not exceed 200 m²/g. The CTAB surface area $SC_{TAB}$ may be lower than 190 m²/g. CTAB surface area $SC_{TAB}$ is a measure of the external specific surface area as determined by measuring the quantity of N hexadecyl-N,N, N-trimethylammonium bromide adsorbed on the silica surface at a given pH.

The BET surface area $S_{BET}$ of the inventive silica is not particularly limited. BET surface area $S_{BET}$ is generally at least 80 m²/g, at least 100 m²/g, at least 120 m²/g. The BET surface area $S_{BET}$ can be as high as 320 m²/g, even as high as 300 m²/g.

The precipitated silica of the invention is further characterised by a broad particle size distribution. Parameter Ld, determined by means of centrifugal sedimentation in a disc centrifuge (CPS) as detailed hereafter, is used to characterize the width of the particle size distribution. Ld is defined as follows:

$$Ld=(d84-d16)/d50$$

Wherein dn is the diameter below which n % of the total measured mass is found. Ld is an adimensional number. The width of the particle size distribution Ld is calculated on the cumulative particle size curve.

The term "particle" is used in the present context to refer to aggregates of primary silica particles. The term "particle" is thus used as a synonym of the term "aggregate".

For the avoidance of doubt, the term "agglomerate" refers to an accumulation of aggregates that are held together. Agglomerates are generally held together by weaker physical forces and can be separated by mechanical means, such as during a mixing operation.

The width of the particle size distribution Ld is at least 1.2, typically at least 1.3, preferably at least 1.4. The width of the particle size distribution Ld is no more than 2.5, typically no more than 2.0.

Advantageously, the width of the particle size distribution Ld of the inventive silica is in the range from 1.3 to 2.5, even in the range from 1.3 to 2.0. The width of the particle size distribution Ld of the inventive silica can be in the range from 1.4 to 2.0, more preferably from 1.4 to 1.8.

The inventive silica typically has a broad pore size distribution. It has been found that the breadth of the pore size distribution, Ldp, as defined hereafter, is advantageously equal to or greater than the value of parameter B defined by equation (II):

$$B=2.61-0.0607\times|DOA| \quad (II)$$

wherein |DOA| has the meaning provided above and B is an adimensional number. The breadth of the pore size distribution, Ldp, is preferably greater than the value of parameter B.

The inventive silica is manufactured by means of a process which comprises the reaction of a silicate with an acid to produce a suspension of precipitated silica, followed by a liquid-solid separation step and optional drying.

In one embodiment, the inventive process comprises the steps of:
(i) providing a starting solution comprising at least a portion of the total amount of the silicate involved in the reaction, the concentration of silicate (expressed in terms of $SiO_2$) in said starting solution being at least 100 g/L;
(ii) adding to said starting solution an acid to obtain a pH value of between 7.0 and 9.0;
(iii) simultaneously adding any remaining silicate and any required additional acid to the reaction mixture obtained in (ii) to maintain the pH value between 7.0 and 9.0;
(iv) adding to the reaction mixture obtained in (iii) an acid to lower the pH to a value of between 4.0 and 6.0 thus obtaining a silica suspension.

In step (i) of the process a starting solution having a pH equal to or greater than 7.0 is provided in the reaction vessel. Typically, the starting solution has a pH of between 8.0 and 13.0, especially between 8.0 and 12.0.

The starting solution contains at least a portion of the total amount of the silicate involved in the reaction. The amount of silicate initially present in the vessel advantageously represents only a portion of the total amount of silicate involved in the reaction. The starting solution is an aqueous solution, that is the solvent is water.

The silicate initially added to the vessel has a concentration, expressed in terms of $SiO_2$, of between 100 g/L and 200 g/L. The initial concentration of silicate (expressed in terms of $SiO_2$) in the vessel is less than 180 g/L, even less than 170 g/L. Preferably, the initial concentration of silicate in the vessel (expressed in terms of $SiO_2$) is greater than 100 g/L, even at least 105 g/L. More preferably the initial concentration of silicate in the vessel is greater than 100 g/L, even at least 105 g/L, and no more than 200 g/L, even no more than 180 g/L.

Any common form of silicate may be used in the process, such as metasilicates, disilicates and advantageously an alkali metal silicate, in particular sodium or potassium silicate. Preferably, the silicate is sodium silicate. When sodium silicate is used, it generally exhibits a ratio $SiO_2/Na_2O$ by weight of between 2.0 and 4.0, in particular between 2.4 and 3.9, for example between 3.1 and 3.8.

The starting solution of step (i) may contain one or more electrolyte. The term "electrolyte" is used herein in its generally accepted meaning, i.e. to identify any ionic or molecular substance which, when in solution, decomposes or dissociates to form ions or charged particles. Mention may be made of salts selected from the group consisting of the salts of alkali metals and alkaline-earth metals. Advantageously, the electrolyte for use in the starting solution is the salt of the metal of the starting silicate and of the acid used in the process. Notable examples are for example sodium chloride in the case of the reaction of a sodium silicate with hydrochloric acid or, preferably, sodium sulfate in the case of the reaction of a sodium silicate with sulfuric acid.

Preferably, when sodium sulfate is used as electrolyte in step (i), its concentration in the starting solution is between 1 and 30 g/L, especially between 3 and 25 g/L, for example between 5 and 20 g/L.

In step (ii) the pH of the reaction medium is reduced to a value of between 7.0 and 9.0, for example of between 7.5 and 8.5 by addition of an acid.

The term "acid" is used herein to refer to one or more than one acid which can be added during the course of the inventive process. Any acid may be used in the process. Use is generally made of a mineral acid, such as sulfuric acid, nitric acid or hydrochloric acid, or of an organic acid, such as acetic acid, formic acid or carbonic acid. Sulfuric acid is preferred.

The acid may be metered into the reaction medium in diluted or concentrated form. The same acid at different concentrations may be used in different stages of the process.

In an embodiment of the process a diluted acid is metered to the reaction medium in the first stages of step (ii) followed by concentrated acid.

Once the desired pH value has been reached, and in the case of a process wherein only a portion of the total amount of silicate is initially present in the vessel, a simultaneous addition of acid and of the remaining amount of silicate is then advantageously carried out in step (iii). Said addition is carried out while maintaining the pH at a constant value of between 7.0 and 9.0, for example of between 7.5 and 8.5.

On conclusion of step (iii) and in particular after the abovementioned addition of acid, a maturing of the resulting silica suspension can be carried out, at the same pH obtained at the end of step (iii). This step is generally carried out with stirring of the suspension, for example for 2 to 45 minutes, in particular for 3 to 30 minutes.

In step (iv) a further addition of acid is carried out to obtain a pH value of between 4.0 and 6.0. A silica suspension is thus obtained.

The entire reaction of the silicate with the acid is generally performed at a temperature of between 7° and 96° C., in particular between 75 and 96° C.

According to one variant of the invention, the entire reaction of the silicate with the acid is performed at a constant temperature, usually of between 7° and 96° C., in particular between 75 and 96° C.

According to another variant of the invention, the temperature at the end of the reaction is higher than the temperature at the start of the reaction: thus, the temperature at the start of the reaction is preferably maintained at between 7° and 80° C. and the temperature is then increased, preferably up to a value of between 85 and 96° C., at which value it is maintained up to the end of the reaction.

At the end of the steps that have just been described, a suspension of precipitated silica is obtained, which is subsequently separated by means of a liquid/solid separation step. The separation step usually comprises a filtration, followed by washing, if necessary. More than one washing step may be performed in order to reduce the residual amount of aluminium and/or other metals, such as alkali metals, in the silica.

The filtration is performed according to any suitable method, for example by means of a belt filter, a rotary filter, for example a vacuum filter, or, preferably a filter press.

The filter cake is then subjected to a liquefaction operation. The term "liquefaction" is intended herein to indicate a process wherein a solid, namely the filter cake, is converted into a fluid-like mass. After the liquefaction step the filter cake is in a flowable, fluid-like form and the precipitated silica is in suspension.

The liquefaction step may comprise a mechanical treatment which results in a reduction of the granulometry of the silica in suspension. Said mechanical treatment may be carried out by passing the filter cake through a high shear mixer, a colloidal-type mill or a ball mill. Optionally, the liquefaction step may be carried out by subjecting the filter cake to a chemical action, for instance by addition of water or an acid. The mechanical and chemical treatments may be both carried out. The suspension of precipitated silica which is obtained after the liquefaction step is subsequently dried.

Drying may be performed according to means known in the art. Preferably, the drying is performed by atomization. To this end, use may be made of any type of suitable atomizer, in particular a turbine, nozzle, liquid pressure or two-fluid spray-dryer.

The process thus typically comprises a further step of filtering the suspension of precipitated silica and drying the precipitated silica.

The inventive precipitated silica can be used in a number of applications, such as absorbent for active materials (in particular support for liquids, especially used in food, such as vitamins (vitamin E or choline chloride), as viscosity modifier, texturizing or anticaking agent.

The inventive precipitated silica finds a particularly advantageous application as filler in polymeric compositions for the preparation of battery separators.

Accordingly a further object of the invention is a composition comprising the inventive precipitated silica and a polyolefin, in particular ultra-high molecular weight polyethylene (UHMWPE).

Still another object of the invention is a film or sheet, in particular a battery separator, comprising the inventive silica and ultra-high molecular weight polyethylene.

The term "polyolefin" means a polymer produced from a simple olefin (also called an alkene with the general formula $C_nH_{2n}$) as a monomer.

Polyethylene is produced by polymerizing ethylene with or without one or more comonomers, polypropylene by polymerizing propylene with or without one or more comonomers, etc. Thus, polyolefins include copolymers such as ethylene/α-olefin copolymers, propylene/α-olefin copolymers, etc.

Ultra-high molecular weight polyethylene (UHMWPE) can be defined as a polyethylene having an intrinsic viscosity of least about 10 dL/g. Intrinsic viscosity may be determined according to ISO standard 1628-3. In many cases the intrinsic viscosity is at least about 14 dL/g. Although there is no particular restriction on the upper limit of the intrinsic viscosity, the intrinsic viscosity is frequently in the range of from about 18 to about 39 dL/g. An intrinsic viscosity in the range of from about 20 to about 35 dL/g is most common.

Sufficient ultra-high molecular weight polyethylene should be present in the composition to provide its properties to the microporous material. Other thermoplastic polymers may also be present, as long as their presence does not materially affect the properties of the final separator material in an adverse manner. Other additives, such as minor amounts of lubricant and antioxidants, may also be present in the composition.

Typically in the preparation of sheets suitable for use as battery separators, the silica to ultra-high molecular weight polyethylene weight ratio is from 1.5:1 to 3.5:1 by weight. The silica may constitute from 5% to 95% by weight of the final separator material. Frequently, silica constitutes from 45% to 90% by weight, even from 45 to 85% by weight, of the final separator material.

The composition may be transformed into a sheet by processing techniques known in the art for ultra-high molecular weight polyethylene.

A method for producing a sheet comprises the steps of: providing an ultra-high molecular weight polyethylene; providing precipitated silica; providing a processing oil; mixing ultra-high molecular weight polyethylene, precipitated silica, processing oil and optionally other ingredients together to form a mixture; extruding said mixture to form a sheet.

The ratio of the ultra-high molecular weight polyethylene to the processing oil is generally 1:30 to 3:2 by weight. The ratio of silica to processing oil is typically 1:15 to 3:1 by weight.

The obtained sheet may be processed by means of standard techniques such as calendering, casting or blowing. In the preparation of sheets suitable as battery separators the sheet is preferably calendered.

In an embodiment of the process described above the processing oil is extracted all or in part from said sheet to produce a matrix comprising ultra-high molecular weight and precipitated silica, the silica being distributed throughout said matrix, to produce a microporous matrix sheet.

In an extrusion and calendering process, the composition, together with additional processing oil, is introduced to the heated barrel of a screw extruder. Attached to the extruder is a sheeting die. A continuous sheet formed by the die is forwarded without drawing to a pair of heated calender rolls acting cooperatively to form a continuous sheet of lesser thickness than the continuous sheet exiting from the die.

The continuous sheet is subjected to an extraction step where processing oil is partially or fully removed. The extraction step may include one or more steps. For example, the continuous sheet from the calender may pass to a first extraction zone where the processing oil is substantially removed by extraction with an organic liquid which is a good solvent for the processing plasticizer, a poor solvent for the organic polymer, and more volatile than the processing oil.

There are many organic extraction liquids that can be used. Examples of suitable organic extraction liquids include but are not limited to hexane, alkanes of varying chain lengths, 1,1,2-trichloroethylene, perchloroethylene, 1,2-dichloroethane, 1,1,1-trichloroethane, 1,1,2-trichloroethane, methylene chloride, chloroform, isopropyl alcohol, diethyl ether and acetone. The continuous sheet then passes to a second extraction zone where the residual organic extraction liquid is substantially removed by: heat, steam and/or water. The continuous sheet is then passed through a forced air dryer for substantial removal of residual water and remaining residual organic extraction liquid. From the dryer the continuous sheet, which is a microporous matrix, is passed to a take-up roll.

The sheets conveniently have thicknesses in the order of 100 to 500 μm, preferably from 200 to 300 μm.

The sheets are suitable as battery separators, in particular as lead-acid battery separators.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

Analytical Methods

The physicochemical properties of the precipitated silica of the invention were determined using the methods described hereafter.

Determination of Silica Agglomerate Size Distribution

The ability of silica to disperse was determined by laser diffraction using a Malvern Mastersizer 3000 on a silica suspension in water submitted to ultrasonic treatment before the measurement. The ultrasonic treatment was carried out using a Vibracell generator model 75043 (750 W) using a 13 mm diameter probe.

The suspension was prepared by weighing accurately, in a 50 mL glass beaker (SCHOTT® DURAN®: d=38 mm, h=78 mm), 2 g of silica and 48 g of deionized water. The suspension was stirred for 20 s with a magnetic stirrer to assure the wetting of all the silica. The beaker was then transferred in a crystallizing dish filled with ice and water and the suspension submitted for 7 minutes to ultrasonic treatment. During this treatment, the ultrasonic probe tip was placed 1 cm from the bottom of the beaker.

The treated suspension was then transferred to the measurement cell of Malvern Mastersizer 3000. The quantity of suspension was adjusted to target an obscuration of 10%, with a tolerance for values between 8 and 15%. The analysis was carried out with the following parameters: Measurement Parameters: duration of the sample measurement: 10 s; duration of blank measurement: 10 s; 3 cycles per measurement.

Mie theory was used for the calculations: optical properties: optical model: silica (n=1.44 0.01) [Mie]; standard analysis, normal sensibility.

$D50_M$ represents the median of the agglomerate size volume distribution curve.

DOA Oil Absorption

DOA oil absorption capacity of silica was measured using a Brabender© Type E Absorptometer with using bis(2-ethylhexyl) adipate (CAS [103-23-1]) commonly known as "DOA". The measurement was carried out as follows: 12.50 g of silica were introduced in the kneader chamber of the Brabender® absorptometer. The rotation speed of the mixer blades was set to 125 rpm and the DOA was added dropwise at room temperature at a flowrate of 4 mL/min. The torque required to rotate the blades was continuously recorded. The measurement was terminated 100 seconds after the torque reached a maximum (this maximum has to be superior to 100 mNm). The experimental recording of the torque was fitted with a polynomial curve and the DOA value was taken as the first experimental point corresponding to 70% of the maximum value reached by the polynomial curve.

The DOA absorption capacity (in mL/100 g) of the silica was defined as:

$$DOA = \frac{V_{70\%}}{m_{silica}} * 100$$

Where $V_{70}\%$ is the added volume of DOA when the torque value reaches 70% of the maximum value of the fitted polynomial curve and $m_{silica}$ is the introduced mass of silica (typically, 12.50 g).

Determination of CTAB Surface Area

CTAB surface area ($S_{CTAB}$) values were determined according to an internal method derived from standard NF ISO 5794-1, Appendix G.

Determination of BET Surface Area

BET surface area $S_{BET}$ was determined according to the Brunauer-Emmett-Teller method as detailed in standard NF ISO 5794-1, Appendix E (June 2010) with the following adjustments: the sample was pre-dried at 200° C.±10° C.; the partial pressure used for the measurement $P/P^0$ was between 0.05 and 0.3.

Determination of the Particle Size Distribution and Particle Size by Centrifugal Sedimentation in a Disc Centrifuge (CPS)

Values of d50, d16, d84 and Ld were determined centrifugal sedimentation in a disc centrifuge using a centrifugal photosedimentometer type "CPS Instruments® DC 24000UHR", marketed by CPS Instruments® company. This instrument is equipped with operating software supplied with the device (operating software version 11 g).

Instruments used: for the measurement requirement, the following materials and products were used: utrasound system: 1500 W generator type Sonics® Vibracell VC1500/VCX1500 equipped with 19 mm probe (Converters: CV154+Boosters (Part No: BHNVC21)+19 mm Probe (Part No: 630–0208)).

Analytical balance with a precision of 0.1 mg (e.g. Mettler Toledo® AE260); Syringes: 1.0 mL and 2.0 mL with 20 ga needles; high shape glass beaker of 50 mL (SCHOTT® DURAN®: 38 mm diameter, 78 mm high); magnetic stirrer with a stir bar of 2 cm; vessel for ice bath during sonication.

Chemicals: deionized water; ethanol 96%; sucrose 99%; dodecane, all from Merck; PVC reference standard from CPS Instruments® Inc.; the peak maximum of the reference standard used should be between 200 and 600 nm (e.g. 237 nm).

Preparation of the Disc Centrifuge

For the measurements, the following parameters were established. For the calibration standard parameters, the information of the PVC reference communicated by the supplier were used.

| Sample Parameters | | |
|---|---|---|
| max. diameter | μm | 0.79 |
| min. diameter | μm | 0.02 |
| particle density | g/mL | 2.11 |
| particle refrative index | | 1.46 |
| particle absorption | K | 0.001 |
| non-sphericity factor | | 1 |
| Calibration Standard Parameters | | |
| peak diameter | nm | 237 |
| half height peak width | μm | 0.023 |
| particle density | | 1.385 |
| Fluid Parameters | | |
| fluid density | g/mL | 1.051 |
| fluid Refractive Index | | 1.3612 |
| fluid viscosity | cps$^x$ | 1.28 |

$^x$cps = centipoise

System Configuration

The measurement wavelength was set to 405 nm. The following runtime options parameters were established:

| | |
|---|---|
| Force Baseline: | Yes |
| Correct for Non-Stokes: | No |
| Extra Software Noise Filtration: | No |
| Baseline Drift Display: | Show |
| Calibration method: | External |
| Samples per calibration: | 1 |

All the others options of the software are left as set by the manufacturer of the instrument.

Preparation of the Disc Centrifuge

The centrifugal disc is rotated at 24000 rpm during 30 min. The density gradient of sucrose (CAS n° 57–50–1) is prepared as follows:

In a 50 mL beaker, a 24% in weight aqueous solution of sucrose is prepared. In a 50 mL beaker, a 8% in weight aqueous solution of sucrose is prepared. Once these two solutions are homogenized separately, samples are taken from each solution using a 2 mL syringe which is injected into the rotating disc in the following order:

Sample 1: 1.8 mL of the 24 wt % solution
Sample 2: 1.6 mL of the 24 wt % solution+0.2 mL of the 8 wt % solution
Sample 3: 1.4 mL of the 24 wt % solution+0.4 mL of the 8 wt % solution
Sample 4: 1.2 mL of the 24 wt % solution+0.6 mL of the 8 wt % solution
Sample 5: 1.0 mL of the 24 wt % solution+0.8 mL of the 8 wt % solution
Sample 6: 0.8 mL of the 24 wt % solution+1.0 mL of the 8 wt % solution
Sample 7: 0.6 mL of the 24 wt % solution+1.2 mL of the 8 wt % solution
Sample 8: 0.4 mL of the 24 wt % solution+1.4 mL of the 8 wt % solution
Sample 9: 0.2 mL of the 24 wt % solution+1.6 mL of the 8 wt % solution
Sample 10: 1.8 mL of the 8 wt % solution Before each injection into the disk, the two solutions are homogenized in the syringe by aspiring about 0.2 mL of air followed by brief manual agitation for a few seconds, making sure not to lose any liquid.

These injections, the total volume of which is 18 mL, aim to create a density gradient useful for eliminating certain instabilities which may appear during the injection of the sample to be measured. To protect the density gradient from evaporation, we add 1 mL of dodecane in the rotating disc using a 2 mL syringe. The disc is then left in rotation at 24000 rpm for 60 min before any first measurement.

Sample Preparation 3.2 g of silica in a 50 mL high shape glass beaker (SCHOTT® DURAN®: diameter 38 mm, height 78 mm) were weighed and 40 mL of deionized water were added to obtain a 8 wt % suspension of silica. The suspension was stirred with a magnetic stirrer (minimum 20 s) before placing the beaker into a crystallizing dish filled with ice and cold water. The magnetic stirrer was removed and the crystallizing dish was placed under the ultrasonic probe placed at 1 cm from the bottom of the beaker. The ultrasonic probe was set to 56% of its maximum amplitude and was activated for 8 min. At the end of the sonication the beaker was placed again on the magnetic stirrer with a 2 cm magnetic stir bar stirring at minimum 500 rpm until after the sampling.

The ultrasonic probe should be in proper working conditions. The following checks have to be carried out and incase of negative results a new probe should be used: visual check of the physical integrity of the end of the probe (depth of roughness less than 2 mm measured with a fine caliper); the measured d50 of commercial silica Zeosil® 1165 MP should be 93 nm±3 nm.

Analysis

Before each samples was analysed, a calibration standard was recorded. In each case 0.1 mL of the PVC standard provided by CPS Instruments® and whose characteristics were previously entered into the software was injected. It is important to start the measurement in the software simultaneously with this first injection of the PVC standard. The confirmation of the device has to be received before injecting 100 μL of the previously sonicated sample by making sure that the measurement is started simultaneously at the injection.

These injections were done with 2 clean syringes of 1 mL.

At the end of the measurement, which is reached at the end of the time necessary to sediment all the particles of smaller diameter (configured in the software at 0.02 μm), the ratio for each diameter class was obtained. The curve obtained is called aggregate size distribution.

Results: The values d50, d16, d84 and Ld are on the basis of distributions drawn in a linear scale. The integration of the particle size distribution function of the diameter allows obtaining a "cumulative" distribution, that is to say the total mass of particles between the minimum diameter and the diameter of interest.

- d50: is the diameter below and above which 50% of the population by mass is found. The d50 is called median size, that is diameter, of the silica aggregate.
- d84: is the diameter below which 84% of the total mass of aggregates is measured.
- d16: is the diameter below which 16% of the total mass of aggregates is measured.
- Ld: is calculated according to equation: Ld=(d84−d16)/d50

Determination of Pore Volume and Size of Pores by Mercury Porosimetry

Pore volume and pore size distribution were determined using a Micromeritics AutoPore® IV 9520 porosimeter; they were calculated by the Washburn relationship with a contact angle theta equal to 1400 and a surface tension gamma equal to 485 dynes/cm. Each sample was dried before the measure in an oven at 200° C. for 2 hours at atmospheric pressure. The starting weight of silica placed in the type 10 penetrometer, having an accuracy of 0.001 g, was selected for good reproducibility of the measurement, in such a way that the "stem volume used", i.e. the percentage mercury (Hg) volume consumed for filling of the penetrometer was from 40% to 80%. The penetrometer was then slowly evacuated to 50 μm of Hg and kept at this pressure for 5 min.

The Micromeritics AutoPore® equipment was operated using Software Version IV 1.09. No corrections were performed on the raw data. The measurement range was from 3.59 kPa (0.52 psi) to 413685 kPa (60000 psi), and at least 100 measurement points were used (19 measurement points from 3.59 kPa (0.52 psi) to 193 kPa (28 psi) with 10 seconds of equilibrium time and then 81 points from 193 kPa (28 psi) to 413685 kPa (60000 psi) with a 20 seconds equilibrium time). If appropriate, the software introduced further measurement points if the incremental intrusion volume was >0.5 mL/g. This corresponds to the first intrusion analysis. The intrusion curve was smoothed by means of the "smooth differentials" function of the equipment software.

After the first intrusion analysis, additional points were measured with decreasing pressures down to 226 kPa (32.8 psi). Then, a second intrusion analysis was carried out with 88 points from 226 kPa (32.8 psi) to 413685 kPa (60000 psi) with a 20 seconds equilibrium time. If appropriate, the software introduced further measurement points if the incremental intrusion volume was >0.5 mL/g.

The Log Differential Intrusion (mL/g) versus pore size data was analysed in the pore diameter range from 3.5 nm to 405 μm.

The values of the mode of the distribution, the breadth of the pore size distribution as well as of the volume of the pores having a diameter of less than 1 μm (VD<1 μm) was determined on the $2^{nd}$ intrusion curve.

The breadth of the pore size distribution, Ldp, is obtained from the pore distribution curve ($2^{nd}$ intrusion) which provides the pore volume (mL/g) as a function of the pore diameter (nm). The coordinates of point S corresponding to the maximum in the curve are determined, wherein Xs is the value of the diameter (nm) and $Y_S$ is value of the pore volume (mL/g). A straight line of equation $Y=Y_S/2$ is plotted on the pore distribution curve. The intercepts of line $Y=Y_S/2$ with the pore distribution curve define points A and B having the x-axis values (nm) $X_A$ and $X_B$, respectively, on either side of Xs; the breadth of the pore distribution curve, Ldp, is equal to the ratio $(X_A-X_B)/Xs$. Ldp is an adimensional number.

Determination of Content of Aluminium

The content of aluminium was determined by means of ICP OES (inductively coupled plasma optical emission spectrometry) after digestion of the sample in fluorhydric acid (e.g. 0.2-0.3 g of $SiO_2$ with 1 mL of fluorhydric acid 40%). The limpid solution was diluted in a 5% nitric acid aqueous solution according to the expected Al concentration. The intensity measured on the Al specific wavelength (396.152 nm) was compared to a calibration curve in the range of 0.05 to 2.00 mg/L obtained using aluminum standards (4 standards at 0.10, 0.20, 1.00 and 2.00 mg/L) in similar analytical conditions. The amount in the solid was obtained by calculation using the dilution factor and the dry extract of the silica measured.

EXAMPLES

Example 1

In a 170 L stainless steel reactor were introduced: 53.8 L of purified water, 0.744 kg of $Na_2SO_4$ (solid), 75.0 kg of a sodium silicate solution ($SiO_2/Na_2O$ ratio=3.43; $SiO_2$ concentration=19.4 wt %, used in all the steps of the process). The concentration of silicate (expressed in terms of $SiO_2$) in the starting solution was 126.5 g/L. The obtained solution was stirred at 143 rpm and heated to reach 76° C. A 7.7 wt % sulfuric acid solution at a flowrate of 1591.8 g/min was then introduced in the reactor over a period of 20 min. After this first step, a 95 wt % sulfuric solution was added at a flowrate of 228.8 g/min until the reaction medium reached the pH value of 8.3. The temperature of the medium was 76° C. for the first 20 min of the addition of sulfuric acid. The reaction medium was then heated to 92° C. in approximately 16 min. The rest of the precipitation reaction was carried out at this temperature.

Simultaneously, over a period of 20 min, were introduced: sodium silicate, at a flowrate of 911.1 g/min, and a 95 wt % sulfuric acid solution. The flowrate of the 95 wt % sulfuric acid solution was regulated so that the pH of the reaction medium was maintained at a value of 8.3.

At the end of the simultaneous addition, the pH of the reaction medium was brought to a value of 4.4 with 95 wt % sulfuric acid at a flowrate of 80.9 g/min. The reaction mixture was allowed to stand for 10 minutes. A suspension of precipitated silica was obtained.

The suspension was filtered and washed on a filter press. The filter cake thus obtained was disintegrated mechanically while adding deionized water in order to reach a silica concentration of 20 wt % in the mixture. The pH of the resulting silica suspension was brought to 6.2 by the addition of 7.7 wt % sulfuric acid solution.

The resulting suspension was dried by means of a nozzle spray dryer to obtain precipitated silica S1. The properties of precipitated silica S1 are reported in Table 1.

Example 2

In a 25 L stainless steel reactor were introduced: 9.83 L of purified water, 0.225 kg of $Na_2SO_4$ (solid), 10.1 kg of a sodium silicate solution ($SiO_2/Na_2O$ ratio=3.42; $SiO_2$ concentration=19.6 wt %, used in all the steps of the process). The concentration of silicate (expressed in terms of $SiO_2$) in the starting solution was 109.6 g/L. The obtained solution was stirred at 390 rpm and heated to reach 83° C. A 7.7 wt % sulfuric acid solution at a flowrate of 209.3 g/min was then introduced in the reactor over a period of 20 min. After this first step, a 95 wt % sulfuric solution was added at a flowrate of 32.1 g/min until the reaction medium reached the pH value of 8.3. The temperature of the medium was 83° C. for the first 20 min of the addition of sulfuric acid. The reaction medium was then heated to 92° C. in approximately 20 min. The rest of the precipitation reaction was carried out at this temperature.

Simultaneously, over a period of 20 min, were introduced: sodium silicate, at a flowrate of 121.9 g/min, and a 95 wt % sulfuric acid solution. The flowrate of the 95 wt % sulfuric acid solution was regulated so that the pH of the reaction medium was maintained at a value of 8.3.

At the end of the simultaneous addition, the pH of the reaction medium was brought to a value of 4.8 with 95 wt % sulfuric acid at a flowrate of 13.7 g/min. The reaction mixture was allowed to stand for 10 minutes. A suspension of precipitated silica was obtained.

The suspension was filtered and washed on a filter press. The filter cake thus obtained was disintegrated mechanically while adding deionized water in order to reach a silica concentration of 20 wt % in the mixture. The pH of the resulting silica suspension was brought to 6.1 by the addition of 7.7 wt % sulfuric acid solution.

The resulting suspension was dried by means of a nozzle spray dryer to obtain precipitated silica S2. The properties of precipitated silica S2 are reported in Table 1.

Example 3

In a 25 L stainless steel reactor were introduced: 6.55 L of purified water, 0.206 kg of $Na_2SO_4$ (solid), 12.3 kg of a sodium silicate solution ($SiO_2/Na_2O$ ratio=3.43; $SiO_2$ concentration=19.4 wt %, used in all the steps of the process). The concentration of silicate (expressed in terms of $SiO_2$) in the starting solution was 143.8 g/L. The obtained solution was stirred at 300 rpm and heated to reach 76° C. A 7.7 wt % sulfuric acid solution at a flowrate of 253.7 g/min was then introduced in the reactor over a period of 20 min. After this first step, a 95 wt % sulfuric solution was added at a flowrate of 34.7 g/min until the reaction medium reached the pH value of 8.5. The temperature of the medium was 76° C. for the first 20 min of the addition of sulfuric acid. The reaction medium was then heated to 92° C. in approximately 20 min. The rest of the precipitation reaction was carried out at this temperature.

Simultaneously, over a period of 20 min, were introduced: sodium silicate, at a flowrate of 148.5 g/min, and a 95 wt % sulfuric acid solution. The flowrate of the 95 wt % sulfuric acid solution was regulated so that the pH of the reaction medium was maintained at a value of 8.5.

At the end of the simultaneous addition, the pH of the reaction medium was brought to a value of 4.2 with 95 wt % sulfuric acid at a flowrate of 17.6 g/min. The reaction mixture was allowed to stand for 5 minutes. A suspension of precipitated silica was obtained.

The suspension was filtered and washed on a filter press. The filter cake thus obtained was disintegrated mechanically while adding deionized water in order to reach a silica concentration of 20 wt % in the mixture. The pH of the resulting silica suspension was brought to 6.1 by the addition of 7.7 wt % sulfuric acid solution.

The resulting suspension was dried by means of a nozzle spray dryer to obtain precipitated silica S3. The properties of precipitated silica S3 are reported in Table 1.

Example 4

In a 25 L stainless steel reactor were introduced: 8.09 L of purified water, 0.215 kg of $Na_2SO_4$ (solid), 11.2 kg of a sodium silicate solution ($SiO_2/Na_2O$ ratio=3.44; $SiO_2$ concentration=19.5 wt %, used in all the steps of the process). The concentration of silicate (expressed in terms of $SiO_2$) in the starting solution was 127.2 g/L. The obtained solution was stirred at 300 rpm and heated to reach 76° C. A 7.7 wt % sulfuric acid solution at a flowrate of 234.0 g/min was then introduced in the reactor over a period of 20 min. After this first step, a 95 wt % sulfuric solution was added at a flowrate of 31.7 g/min until the reaction medium reached the pH value of 8.5. The temperature of the medium was 76° C. for the first 20 min of the addition of sulfuric acid. The reaction medium was then heated to 92° C. in approximately 20 min. The rest of the precipitation reaction was carried out at this temperature.

Simultaneously, over a period of 20 min, were introduced: sodium silicate, at a flowrate of 135.2 g/min, and a 95 wt % sulfuric acid solution. The flowrate of the 95 wt % sulfuric acid solution was regulated so that the pH of the reaction medium was maintained at a value of 8.5.

At the end of the simultaneous addition, the pH of the reaction medium was brought to a value of 4.1 with 95 wt % sulfuric acid at a flowrate of 13.7 g/min. The reaction mixture was allowed to stand for 5 minutes. A suspension of precipitated silica was obtained.

The suspension was filtered and washed on a filter press. The filter cake thus obtained was disintegrated mechanically while adding deionized water in order to reach a silica concentration of 20 wt % in the mixture. The pH of the resulting silica suspension was brought to 6.1 by the addition of 7.7 wt % sulfuric acid solution.

The resulting suspension was dried by means of a nozzle spray dryer to obtain precipitated silica S4. The properties of precipitated silica S4 are reported in Table 1.

Comparative Example 1

In a 25 L stainless steel reactor were introduced: 12.77 L of purified water, 246 g of $Na_2SO_4$ (solid), 7.74 kg of a sodium silicate solution ($SiO_2/Na_2O$ ratio=3.43; $SiO_2$ concentration=19.4 wt %, used in all the steps of the process). The concentration of silicate (expressed in terms of $SiO_2$) in the starting solution was 78.8 g/L. The obtained solution was stirred and heated to reach 83° C. A 7.7 wt % sulfuric acid solution at a flowrate of 164.7 g/min was then introduced in the reactor over a period of 20 min. After this first step, a 95 wt % sulfuric solution was added at a flowrate of 25.9 g/min until the reaction medium reached the pH value of 8.5. The temperature of the medium was 83° C. for the first 20 min of the addition of sulfuric acid. The reaction medium was then heated to 92° C. in approximately 20 min. The rest of the precipitation reaction was carried out at this temperature.

Simultaneously, over a period of 20 min, were introduced: sodium silicate, at a flow rate of 93.3 g/min, and a 95 wt % sulfuric acid solution. The flow rate of the 95 wt % sulfuric acid solution was regulated so that the pH of the reaction medium was maintained at a value of 8.5.

At the end of the simultaneous addition, the pH of the reaction medium was brought to a value of 4.2 with 95 wt % sulfuric acid at a flowrate of 12.5 g/min. The reaction mixture was allowed to stand for 10 minutes. A suspension of precipitated silica was obtained.

The suspension was filtered and washed on a filter press. The filter cake thus obtained was disintegrated mechanically while adding deionized water in order to reach a silica concentration of 13% in the mixture. The pH of the resulting silica suspension was brought to 6.2 by the addition of 7.7 wt % sulfuric acid solution.

The resulting suspension was dried by means of a nozzle spray dryer to obtain precipitated silica CS1.

The properties of precipitated silica CS1 are reported in Table 1. The median agglomerate size $D50_M$ of silica CS1 is much lower than the calculated value of parameter A. The mechanical properties of separators containing silica CS1 are expected to be worse than those of separators containing the inventive silica because of polymer degradation.

TABLE 1

| Silica | S1 | S2 | S3 | S4 | CS1 | CS2 | CS3 |
|---|---|---|---|---|---|---|---|
| CTAB ($m^2/g$) | 146 | 113 | 105 | 116 | 145 | 192 | 148 |
| BET ($m^2/g$) | 182 | 131 | 147 | 210 | 185 | 269 | 180 |
| DOA (mL/100 g) | 251 | 242 | 215 | 237 | 266 | 239 | 231 |
| Al (ppm) | 809 | 490 | 420 | 613 | 402 | 424 | 745 |
| $D50_M$ (μm) | 6.2 | 5.5 | 8.5 | 7.4 | 0.5 | 9.2 | 4.9 |
| A | 4.2 | 4.9 | 7.0 | 5.3 | 3.1 | 5.1 | 5.7 |
| Mode (nm) $2^{nd}$ intrusion | 44 | 74 | 74 | 63 | 38 | 27 | 34 |
| VD < 1 μm (mL/g) $2^{nd}$ intrusion | 1.45 | 1.60 | 1.47 | 1.53 | 1.15 | 1.17 | 1.42 |
| Ldp $2^{nd}$ intrusion | 1.19 | 1.20 | 1.24 | 1.27 | 0.84 | 0.59 | 0.93 |
| B | 0.93 | 0.99 | 1.17 | 1.02 | 0.83 | 1.01 | 1.06 |

Silica CS2: Tixosil ® 38AB, precipitated silica commercially available from Solvay SA.
Silica CS3: HiSil ® WB10D, precipitated silica available from PPG Industries.

Example 5

Performances of the silica of the invention were tested when formulated and transformed into experimental battery separators. The composition of the separators was as follows:

| Ingredient | % weight |
|---|---|
| Silica | 30.57 |
| UHMWPE GUR ® 4150 (Celanese Ticona) | 11.41 |
| Irganox ® B-215 (Ciba Specialty Chemicals) | 0.13 |
| Synpro ® 1580 (Ferro) Corporation | 0.13 |
| Nytex ® 820 (Ninas) | 57.76 |

The dry ingredients were weighed into a universal jacketed Diosna® GmbH V10 mixer model. This model comes with a three-winged mixing tool on the bottom and a chopper on the side. The products were mixed without the process oil for 15 to 20 minutes at 85° C. using the three-winged mixing tool at low intensity (chopper off). The process oil was weighed and stirred into a stainless steel jacketed reactor at 85° C. for 15 to 20 minutes and then it was transferred to the mixer. To promote uniform dispersion in the dry materials the process oil was sprayed into the mixer using a Teejet 800050 brass spray (Spraying System Company) over a 7 minutes period. Temperature was maintained at 85° C. during mixing process. Mixing was carried out using both the mixing tool on the bottom (high intensity) and the chopper (high intensity) for 30 minutes.

The mixed formulas were extruded and compression molded into battery separator sheets.

Extrusion of the mixture was performed using a co-rotating twin screw extruder from the Leistritz Company ZSE MASS® (ZSE 18MAXX-44D) having an oil injection port in the first sector of the barrel. Process oil was injected into the extruder to reach a total oil content in the battery separator sheet of 67-70% weight. The extruder was equipped with an 18 cm flat die to produce film thickness inferior to 400 μm. Temperature of the die was set at 180° C. Head rolls were heated to 40° C. and were set at a rolling speed of less than 1 m/min at 7 N tension approximately. Total feed rate was 3.6 kg/h and screw speed was 400 rpm.

To reduce the thickness of the sheets and to erase the polymer thermal process history, the sheets were compression molded in a heated mold designed with a thickness of 250 μm while heat was applied. The sheet was placed in the mold and heated to 160° C. without pressure for 2 minutes and then maintained for additional 2 minutes under a load of 240 bar.

In order to obtain the final separator sheet the process oil was extracted using isopropyl alcohol under reflux using a horizontal Soxhlet apparatus. Three extraction cycles were repeated to ensure complete extraction of the oil from the sheet.

All the separator sheets were checked to have the same silica to PE ratio and for complete process oil removal.

Three of the extracted, dried samples were boiled in water for ten minutes, soaked in sulfuric acid (specific gravity=1.281±0.005@ 26.7° C.) for 20 minutes, and tested for electrical resistance according to BCIS-03B March 2010 standard using a Palico low resistance measuring system Model™ 9100-2 (Palico Instrument Laboratories, Circle Pines, Minn.). The electrical resistivity value reported in Table 2 was calculated from the measured value ($ER_{raw}$) using the formula: $ER=ER_{raw}$ (mohm)*32.258 cm$^2$/average separator thickness (cm), wherein 32.258 cm$^2$ is the opening of the test cell.

Puncture resistance of the separator sheets was determined according to BCIS-03B standard with the use of a Lloyd-Ametek® LS1 tester. Backweb thickness was measured via an Adamel-Lhomargy gauge with a precision of 0.01 mm. Three replicates were run of each experimental separator sheet. The results shown in Table 2 are the values of the puncture resistance normalized for the sheet thickness expressed in mm.

Alpha parameter is defined by the ratio between distilled water volume fraction accessible to the oil-free separator EDI and the isopropyl alcohol volume fraction accessible to that same oil-free separator EIPA. This value provides an indication of the ratio between the water wettable porosity in the sheet and the total porosity of the sheet (determined using isopropyl alcohol). Alpha parameter is given by the formula:

alpha parameter=εDI/εIPA

The distilled water volume fraction accessible to the oil-free separator (EDI) was obtained with the use of a METTLER TOLEDO® density kit scales combined with a ML 303T analytical scale. First, a sample of diameter 40×70 mm was taken from the separator sheets as prepared above, then it was dried in a ventilated oven at 105° C. for 2 h and weighed (dry weight w1). Then, the sample was immersed into boiling distilled water for 10 to 12 minutes, then immersed into a container containing room temperature distilled water and then weighed, with the help of the density kit, in order to obtain the wet weight in distilled water (wDI2). The sample was then removed from the support and carefully cleaned from the excess of distilled water with a tissue. After that, the sample was immediately weighed in air to obtain the DI wet weight in air (wDI3). Then, EDI is obtained from the formula:

εDI=(wDI3−w1)/(wDI3−wDI2).

The isopropyl alcohol volume fraction accessible to IPA (EIPA) was determined on the same 40×70 mm sample used to determine (εDI) the distilled water volume fraction accessible to the oil-free separator. Between the two analyses, the sample was dried again in the same conditions (ventilated oven at 105° C. for 2 h) and weighed again (w1). Then, the sample was immersed into isopropyl alcohol at room temperature over 10 minutes and weighed into isopropyl alcohol with the help of the density kit, in order to obtain the wet weight in isopropyl alcohol wIPA2. The sample was then removed from the support and carefully cleaned from the excess of isopropyl alcohol with a tissue. After that, the sample was immediately weighed in air to obtain the isopropyl alcohol wet weight in air (wIPA3). Then, EIPA is obtained from the formula:

εIPA=(wIPA3−w1)/(wIPA3−wIPA2).

The results are shown in Table 2.

TABLE 2

| Silica in composition | Electrical resistivity (mohm · cm) | Normalized puncture resistance (N/mm) | Alpha parameter |
|---|---|---|---|
| S1 | 5812 | 26.4 | 0.58 |
| CS2 | 7956 | 23.2 | 0.49 |
| CS3 | 6811 | 25.9 | 0.58 |

The separator containing the inventive silica S1 exhibits lower electrical resistivity than those containing silica CS2 and CS3.

Insufficient resistance of a separator to puncture may contribute to separator damage and potential early battery failure. The separator containing silica S1 has also a higher puncture resistance compared with the separator containing CS2 and CS3.

Alpha parameter provides an indication of the ability of the battery electrolyte to wet and permeate the separator, hence it provides an indication of the ability of the separator to conduct charge between the anode and cathode side of the battery. The inventive silica allows the preparation of separators having a slightly higher alpha parameter than the prior art silica.

Overall separators containing the inventive silica have better electrical properties as well as mechanical properties.

The invention claimed is:

1. A process for the preparation of a precipitated silica, the precipitated silica being characterized by:
   a DOA oil absorbing equal to or greater than 200 ml/g100 g;
   a median aggregate size D50M, as determined by laser diffraction after submitting a suspension of the precipitated silica in water for 7 minutes to an ultrasonic treatment using a 750 W ultrasound generator, equal to or lower than 8.7 m and equal to or greater than a parameter A whose value, expressed in microns, is calculated from equation (I):

$A=23.3-0.076\times IDOAl$ (I)

wherein IDOAl represents the numerical value of the DOA oil absorption expressed in mL/100 g, and said process comprising the steps of:

(i) providing a starting solution comprising at least a portion of the total amount of the silicate involved in a reaction, the concentration of silicate, expressed in terms of SiO$_2$, in said starting solution being at least 100 g/L, said starting solution constituting a reaction mixture before a reaction between the silicate and an acid starts;

(ii) adding to said reaction mixture constituted in (i) an acid to obtain a pH value of between 7.0 and 9.0 to obtain another reaction mixture;

(iii) simultaneously adding any remaining silicate and any required additional second acid to said other reaction mixture obtained in (ii) to maintain the pH value between 7.0 and 9.0; and (iv) adding to a reaction mixture obtained in (iii) a third acid to lower the pH to a value of between 4.0 and 6.0 thus obtaining a silica suspension.

2. The process of claim 1 wherein the acid, the second acid and the third acid are a mineral acid.

3. The process of claim 2, wherein the mineral acid is selected from the group consisting of sulfuric acid, nitric acid, hydrochloric acid.

4. The process of claim 2 wherein the mineral acid is sulfuric acid.

5. A process for the preparation of a precipitated silica, said precipitated silica being characterised by:
a DOA oil absorption equal to or greater than 200 mL/100 g;
a median aggregate size D50M, as determined by laser diffraction after submitting a suspension of the precipitated silica in water for 7 minutes to an ultrasonic treatment using an ultrasound generator having a nominal power of 750 W and a 13 mm probe, equal to or lower than 8.7 m and equal to or greater than a parameter A whose value, expressed in microns, is calculated from equation (I):

$$A = 23.3 - 0.076 \times IDOAl \quad (I)$$

wherein IDOAl represents the numerical value of the DOA oil absorption expressed in mL/100 g,
and said process comprising the steps of:
(i) providing a starting solution comprising at least a portion of the total amount of the silicate involved in a reaction, the concentration of silicate, expressed in terms of SiO$_2$, in said starting solution being greater than 100 g/L and no more than 200 g/L, and said starting solution constituting a reaction mixture before a reaction between the silicate and an acid starts;

(ii) adding to said reaction mixture constituted in (i) an acid to obtain a pH value of between 7.0 and 9.00 to obtain another reaction mixture;

(iii) simultaneously adding any remaining silicate and any required additional second acid to said other reaction mixture obtained in (ii) to maintain the pH value between 7.0 and 9.0; and (iv) adding to a reaction mixture obtained in (iii) a third acid to lower the pH to a value of between 4.0 and 6.0 thus obtaining a silica suspension.

6. The process of claim 5 wherein the acid, the second acid and the third acid are a mineral acid.

7. The process of claim 6 wherein the mineral acid is selected from the group consisting of sulfuric acid, nitric acid, hydrochloric acid.

8. The process of claim 6 wherein the mineral acid is sulfuric acid.

9. The process of claim 5, wherein the concentration of silicate in the starting solution of step (i) is less than 170 g/L.

10. The process of claim 9, wherein the concentration of silicate in the starting solution of step (i) is of from 109.6 g/L to 143.8 g/L.

11. The process of claim 10, wherein the concentration of silicate in the starting solution of step (i) is 109.6 g/L or 126.5 g/L or 127.2 g/L or 143.8 g/L.

12. The process of claim 5, further comprising the steps of filtering the silica suspension obtained at the end of the step (iv), optionally washing, to obtain a wet precipitated silica, and drying the wet precipitated silica thus obtained to obtain a dried precipitated silica.

13. The process of claim 12, wherein the precipitated silica has a particle size distribution, wherein a width of the particle size distribution Ld, measured by centrifugal sedimentation, is of at least 1.2 and no more than 2.5.

14. The process of claim 13, wherein the width of the particle size distribution Ld, measured by centrifugal sedimentation, is in a range from 1.4 to 2.0.

* * * * *